Patented Aug. 22, 1944

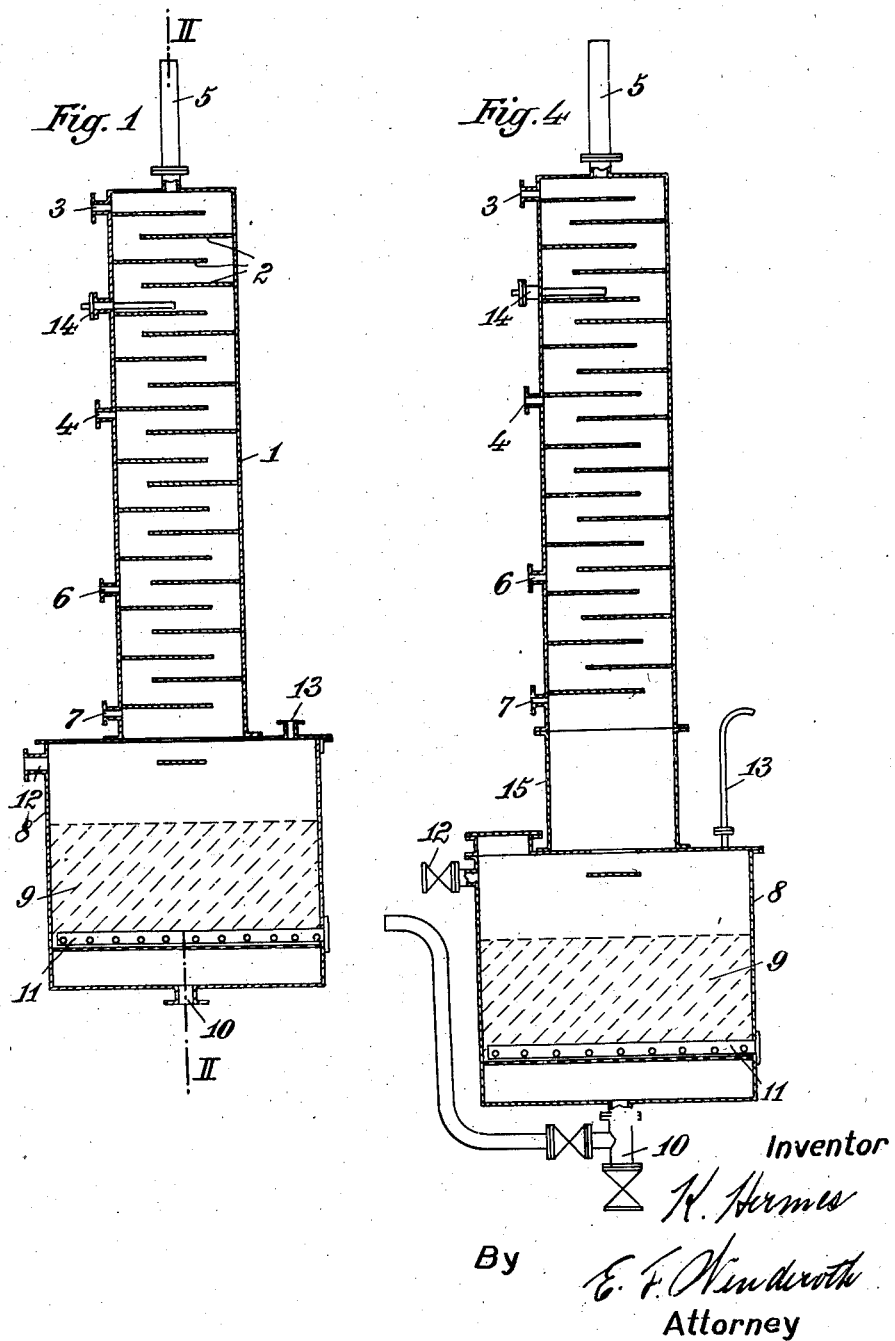

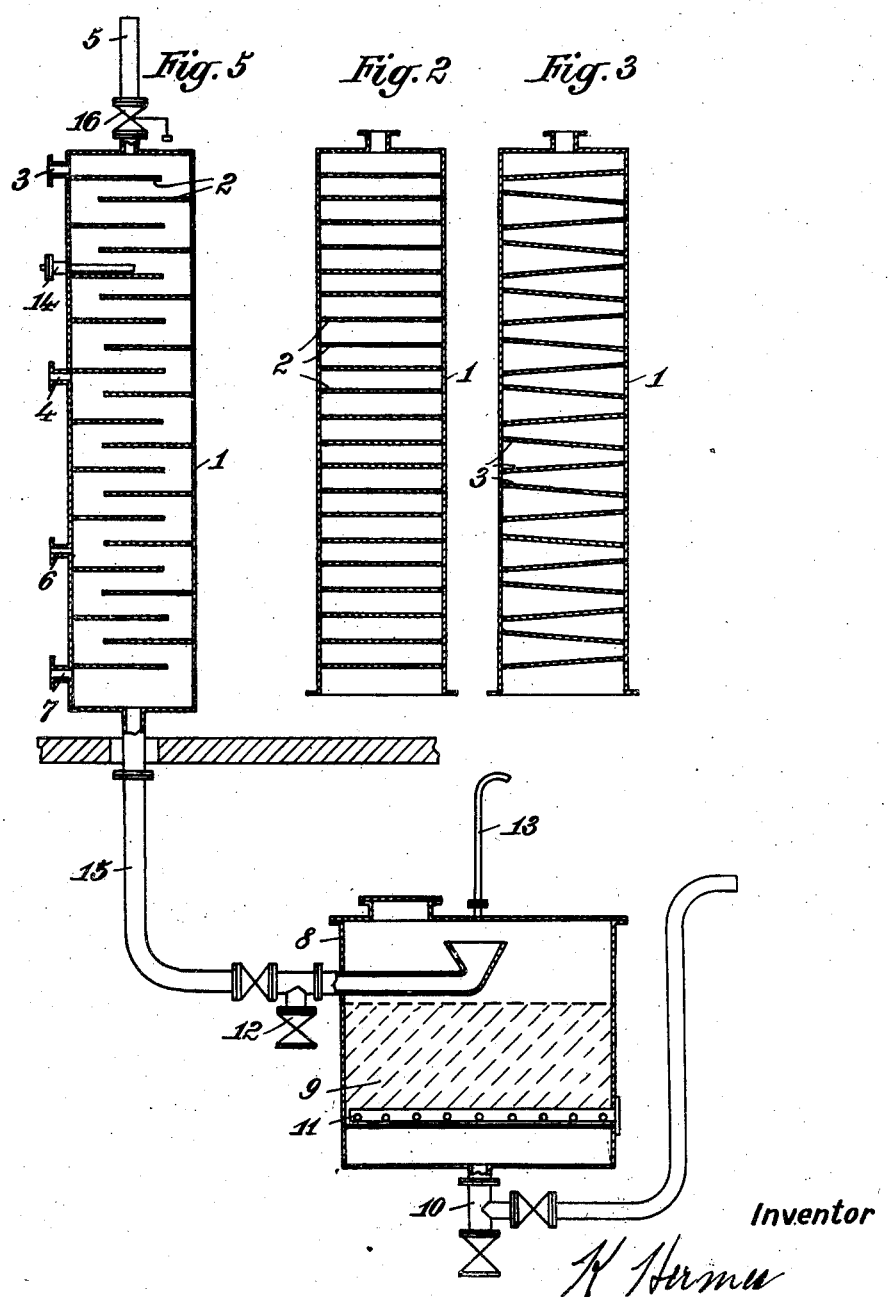

2,356,405

UNITED STATES PATENT OFFICE 2,356,405

SOFTENING FEED WATER FOR BOILERS

Karl Hermes, Mainz, Germany; vested in the Alien Property Custodian

Application June 28, 1938, Serial No. 216,342
In Germany July 3, 1937

4 Claims. (Cl. 210—16)

My invention relates to a process and an apparatus for softening feed water for boilers.

A principal object of the invention is to provide a single apparatus for softening water, in which both steps together, the pre-softening and also the after-softening of the water take place, such apparatus comprising a cascade or a tower apparatus.

A further object of the invention is to provide an apparatus for softening water, which is very economical in its building-up, and which results also in a saving in structural material and in space on the floor of the boiler house, and in the foundation work.

A further object is to provide an apparatus in which the softening proceeds particularly quickly and without friction.

Still another object is to provide a method of softening feed water, in which the flakes composed of the material, which cause the hardness of the water, can be removed without trouble in the usual filters, and in which the water filters extremely well.

Another object of the invention is to provide a method of softening water, in which the water is flowing away from the filter quite clear, and in which no incrustation is formed in the pores of the filtering gravel.

Still further objects will be appearing from the following description:

It is already known to effect the softening of boiler feed water by means of chemicals, in particular chemicals having an alkaline reaction, such as lime, soda, tri-sodium-phosphate or similar materials. Blow-down boiler water which still contained chemicals used for softening, particularly chemicals having an alkaline reaction, has also been employed for softening boiler feed water. It is also known to split up the process of softening boiler feed water into a pre-softening and an after-softening in which case alkaline blow-down boiler water was used for pre-softening and chemicals, such as tri-sodium phosphate for example, were used for the after-softening.

For softening water with the aid of chemicals on the other hand it has, in general, been considered necessary to employ a reaction vessel of large size. As compared therewith, the softening process according to my present invention takes place in a single apparatus, namely in a cascade or tower apparatus, which however is somewhat longer than the towers hitherto used. That the entire softening process could be completed during the passage of the crude water through the cascade or tower apparatus could in no way be foreseen.

Various forms of apparatus for carrying out the new softening process are illustrated diagrammatically and by way of example in the accompanying drawings, in which:

Fig. 1 shows one form of apparatus in longitudinal section,

Fig. 2 is a section on the line II—II of Fig. 1,

Fig. 3 is a section through another form of a cascade or tower apparatus also on the line II—II of Fig. 1, and Figs. 4 and 5 are further constructional forms of the new softening apparatus.

Referring to the drawings, the cascade or tower apparatus 1 is provided in the usual manner with intermediate plates 2 which are either arranged horizontally as shown in Fig. 2 or are disposed obliquely relatively to one another as shown in Fig. 3. The crude water enters the tower through the inlet 3 and meets the blow-down boiler water which is introduced through the inlet 4. The gases evolved escape through the pipe 5. When the crude water and the blow-down boiler water mix, a pre-softening of the crude water is effected in accordance with the amount of the chemicals contained in the blow-down boiler water. To the water which has been pre-softened in this manner a solution of softening chemicals is supplied through the inlet 6. In the case of the apparatus with inclined plates shown in Fig. 3, where the water runs down over one edge of the plate, the supply of chemicals is preferably effected at this place where the water mostly collects since the mixing is then most intensive.

For the after-softening, tri-sodium-phosphate is preferably employed since this eliminates from the water any carbonates causing hardness and converts them into the form of calcium or magnesium phosphate and simultaneously forms soda which in turn act as pre-softening agents on the return of the boiler water so that one and the same chemical is, as it were, used twice for the softening. Instead of tri-sodium-phosphate other known softening agents can also be employed such as aluminates, soda, caustic soda, or combinations thereof.

The distance apart of the inlets for the crude water, the blow-down boiler water and chemical solution depends of course on the desired capacity of the softening installation and also on the quality of the water and on the softening agents employed. An intermediate chamber with one plate between each two stages may even be sufficient in some cases.

If the heat of the blow-down boiler water is not sufficient for producing the temperature required in the cascade or tower apparatus, steam can be blown in through the inlet 7 at the lower end of the tower. The temperature can be controlled, if desired, by means of a thermostat 14 which is preferably arranged between the inlet 3 for the crude water and the inlet 4 for the blow-down boiler water; then when the temperature falls the inlet for the supply of steam or boiler water is opened to a greater extent by the thermostat 14 and when the temperature rises the supply of steam or boiler water is reduced.

The water which has been softened in this manner arrives in the filter in which it flows through the filtering gravel 9 where the flakes of the materials which caused the hardness are retained. The water leaves the apparatus through the outlet 10 in a clear condition ready for use.

The usual back-flushing device 11 which consists of a tube provided with holes is fitted in the filter. The flushing water leaves the filter through the outlet 12, which, however, remains closed during the softening and filtering operation. Finally an over-flow pipe 13 is provided which indicates when any blocking or stoppage of the filter occurs. Obviously any other suitable kind of filter could be employed.

In normal operation the resistance of the filter of course increases gradually owing to the flakes of the materials, which cause the hardness, being deposited therein. Consequently the depth of the layer of water above the gravel continuously increases which in turn results in a continuous increase in the water pressure. In order now to prevent a return flow of the water above the gravel, it is preferable to connect the lower part of the cascade or tower apparatus to the filter by a pipe 15 as shown in Fig. 4. This pipe is advantageously made as wide as possible, for example as shown in the drawings, as large as the cross-section of the tower since a separate frame for supporting the tower is then unnecessary.

Fig. 5 illustrates a form of apparatus in which the tower is not in communication with the atmosphere but operates under an excess pressure. This may be the case for example when the apparatus is to be employed on board ship. Consequently there is provided in the outlet 5 of the tower a valve 16 through which any gases which collect in the tower, such as carbon dioxide, oxygen and any excess steam, are blown-off when a predetermined pressure is reached. In addition the apparatus shown in this figure also enables the tower and the filter to be separated the one from the other, for example to be disposed in different compartments or on different decks, in which case the pipe 15 which connects them is of suitable shape and length.

What I claim is:

1. An apparatus for softening boiler feed water comprising a quadrilateral tower, two series of vertically spaced plates mounted on the inner faces of two of the opposite walls of the tower respectively, and extending between the other two opposite walls, the plates of the two series alternating, and each plate having a free end spaced from the wall opposite the wall on which the plate is mounted, the free ends of the plates of one series overlapping the free ends of the plates of the other series, means to supply the crude water into the tower above the uppermost plate, means to supply the blow-down boiler water into the tower below the point at which the crude water is supplied, and above the lowermost plate, means to supply a chemical softening agent into the tower below the point at which the blow-down boiler water is supplied, and above the lowermost plate, means to supply steam into the tower below the lowermost plate, means above the uppermost plate to evacuate gases from the tower, means below the lowermost plate to evacuate water from the tower, and a filter connected with the water evacuation means.

2. An apparatus for softening boiler feed water comprising a quadrilateral tower, two series of vertically spaced plates mounted on the inner faces of two of the opposite walls of the tower respectively, and extending between the other two opposite walls, the plates of the two series alternating, and each plate having a free end spaced from the wall opposite the wall on which the plate is mounted, the free ends of the plates of one series overlapping the free ends of the plates of the other series, means for separately introducing into the tower the crude water, the blow-down boiler water, a chemical softening agent and steam, the several means being so related that the crude water is supplied above the topmost plate, the blow-down boiler water is supplied below the inlet of the crude water, the softening agent is supplied below the blow-down boiler water, the crude water, blow-down boiler water and softening agent being introduced above the lowermost plate, and the steam is introduced below the lowermost plate, means above the uppermost plate to evacuate gases from the tower, means below the lowermost plate to evacuate water from the tower, and a filter connected with the water evacuating means.

3. An apparatus according to claim 1, in which the plates are horizontally mounted.

4. An apparatus according to claim 1, in which the plates of one series are downwardly inclined from one wall to which they extend, and the plates of the other series are downwardly inclined from the other wall to which they extend.

KARL HERMES.